United States Patent [19]

Meska et al.

[11] Patent Number: 4,566,666

[45] Date of Patent: Jan. 28, 1986

[54] SMALL APPLIANCE WALL BRACKET

[76] Inventors: Robert J. Meska; Mary F. Bishop, both of P.O. Box 21, Michigan City, Ind. 46360

[21] Appl. No.: 616,075

[22] Filed: Jun. 1, 1984

[51] Int. Cl.[4] .............................................. F16M 13/00
[52] U.S. Cl. ...................................... 248/558; 174/66; 248/51; 248/205.1; 248/302; 248/309.1; 248/916
[58] Field of Search ............... 248/51, 302, 303, 304, 248/316.8, 309.1, 309.2, 315, 231.9, 224.3, 224.4, 225.1, 220.2, 558, 205.1, 916; 220/3.8, 241, 242; 174/66, 67

[56] References Cited

U.S. PATENT DOCUMENTS

| | | | |
|---|---|---|---|
| 997,858 | 7/1911 | Savage | 248/303 X |
| 1,134,813 | 4/1915 | Best | 248/303 X |
| 1,438,659 | 12/1922 | Nailor | 248/303 X |
| 1,493,799 | 5/1924 | Blei | 248/51 |
| 2,025,707 | 12/1935 | Consolazio | 248/315 |
| 2,929,886 | 3/1960 | Marback | 248/303 X |
| 2,949,510 | 8/1960 | Sichel | 248/224.4 X |
| 3,113,996 | 12/1963 | Sanford | 220/241 X |
| 3,547,392 | 12/1970 | Tanzer | 248/303 X |

Primary Examiner—J. Franklin Foss
Assistant Examiner—David L. Talbott
Attorney, Agent, or Firm—Richard G. Kinney

[57] ABSTRACT

An improved wall bracket and kit for making such a bracket for hair dryers and like small electrical appliances is disclosed which uses two plastic coated malleable wire bracket members that can be hand-bent to the desired shape to receive any one of many different shapes to receive any one of many different sized and shaped appliances. One wire member is longer than the other and has a performed U-shaped end loop for hanging the appliance electric cord looped over it. In one embodiment of the bracket and kit, the wire members are mountable in a two-part base that is also a cover plate for an electrical power outlet (e.g., that is commonly next to a bathroom sink) so that the hair dryer can be conveniently stored in an accessible place. In a second embodiment, the base is generally circular and mounted by either a central screw and/or adhesive. In both of these embodiments, the bases have a front and back portion that define T-shaped hollows that closely receive the ends bent into an elbow of the wire members, the longer wire member being seated selectively in either of the T-shaped hollows upon assembly so as to be on the right or left side of the base. Modifications are further disclosed that are mounted to a wall by a screw or into a pegboard.

12 Claims, 11 Drawing Figures

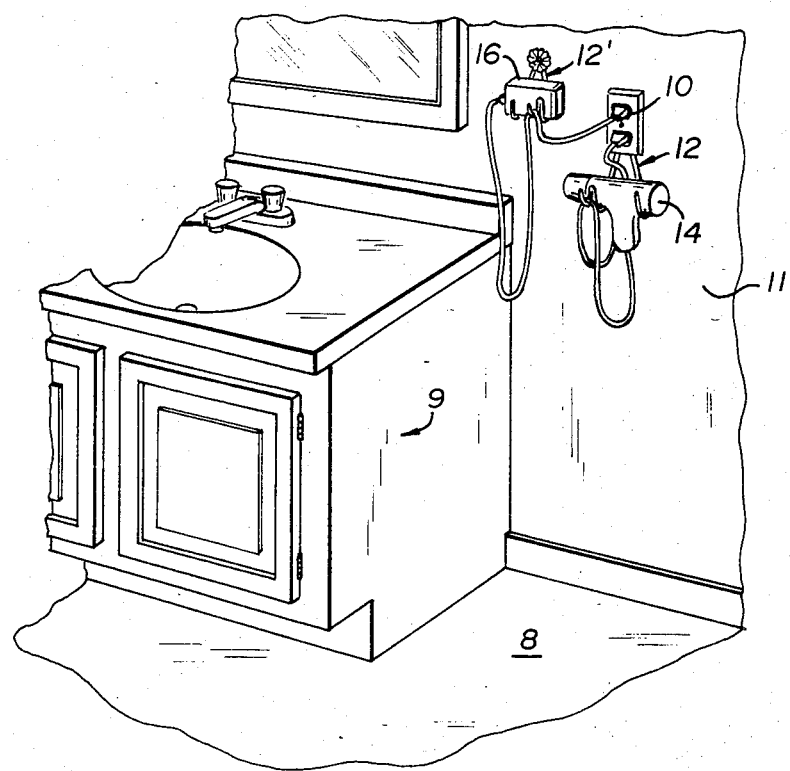
Fig. 1
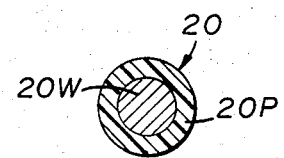
Fig. 3
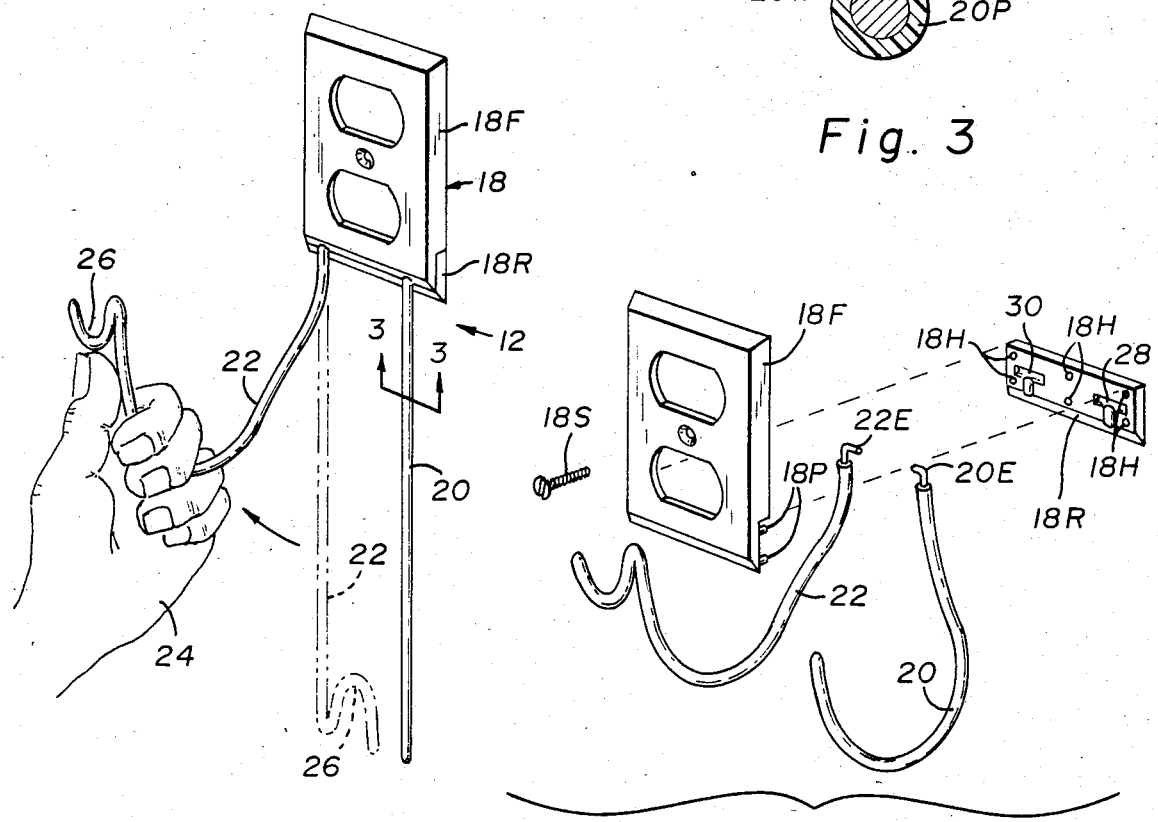
Fig. 2
Fig. 4

U.S. Patent   Jan. 28, 1986   Sheet 3 of 3   4,566,666
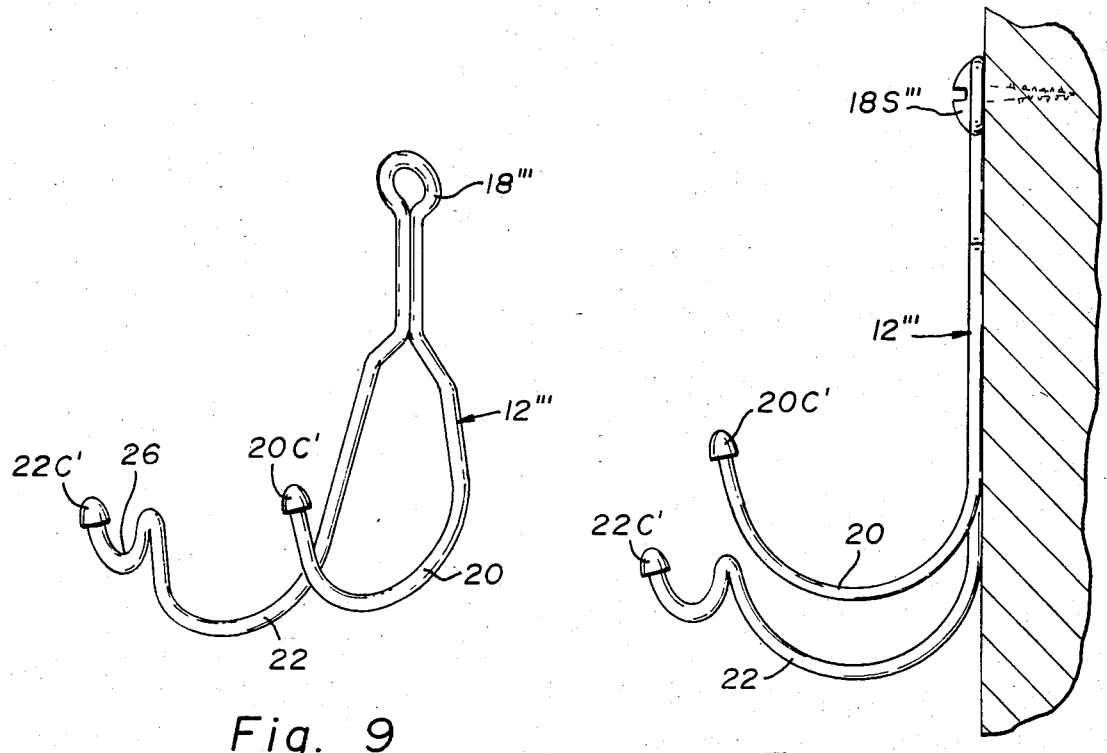
Fig. 9
Fig. 10
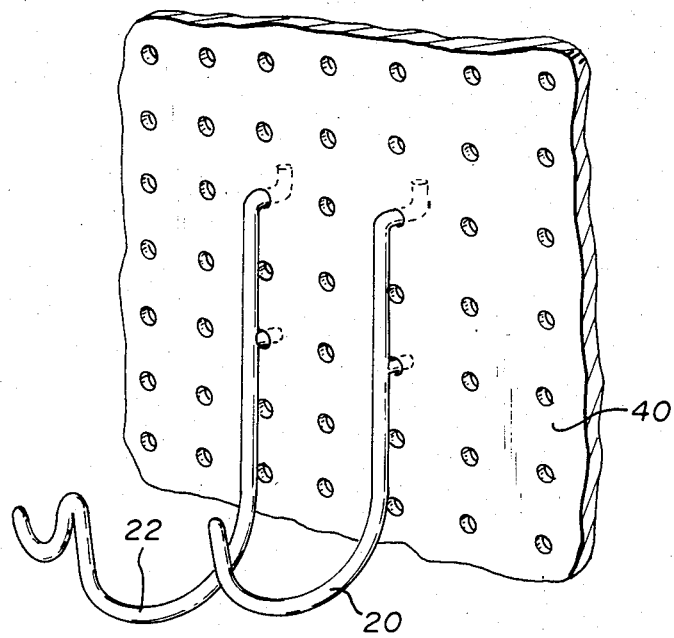
Fig. 11

SMALL APPLIANCE WALL BRACKET

BACKGROUND OF THE INVENTION

1. Field of the Invention

The present invention is directed to novel wall brackets for use in holding small appliances, such as electric hair dryers.

2. Description of the Prior Art

Wall brackets and shelves have been in use since prehistoric times. With the advent of wire and rods, these have been adapted and bent to this use. See, for example, these early patents: Fisher U.S. Pat. No. 360,577 entitled Wardrobe Hook issued in 1887; Taylor U.S. Pat. No. 305,861 entitled Hat and Coat Hook issued in 1884; Randall U.S. Pat. No. 269,538 entitled Rack or Support for Garments issued in 1882; Phillips, et al. U.S. Pat. No. 383,983 entitled Harness Rack issued in 1888; Carnell U.S. Pat. No. 540,044 entitled Coat and Hat Hook issued in 1895; Cummings, et al. U.S. Pat. No. 601,502 entitled Garment Hanger issued in 1898; Faries U.S. Pat. No. 398,886 entitled Rest For Display Frames issued in 1889; Naumann U.S. Pat. No. 520,214 entitled Rack For Musical Instruments issued in 1894; and Van U.S. Pat. No. 444,079 entitled Holder or Rack For Brooms issued in 1891.

Such brackets were formed of stiff wire bent permanently into useful arrangements sized and shaped for receiving everything from garments to brooms.

Invention did not cease in the field with the new century as attested to by more recent patents such as Capocci U.S. Pat. No. 2,778,588 entitled Holder For Brooms and The Like issued in 1957. Capocci uses the stiff spring nature of such wires to advantage.

And brackets, often using movable parts and wire supports that form springs and adapted to hold various small items, are shown in Wyatt U.S. Pat. No. 1,483,035 entitled Toilet Device, showing a toothbrush holder for mounting in a bathroom; Goldfus U.S. Pat. No. 2,980,379 entitled Detachable Supporting Rack, for holding a small radio to a window; Adams U.S. Pat. No. 2,603,438 entitled Iron Holder; Schumacker U.S. Pat. No. 1,540,959 entitled Curling Iron Holder; Schumacker U.S. Pat. No. 3,096,008 entitled Mitten Holding, Stretching and Shaping Device; Michaels U.S. Pat. No. 1,409,056 entitled Holder for Towels and Other Articles; etc.

The utility of combining unitarily a hook or tray into a cover plate for an electrical switch or outlet is recognized in Sanford U.S. Pat. No. 3,113,996.

Specific wall brackets that are for specific electric shavers (Weldon U.S. Pat. No. 2,992,805 and Thielfoldt, et al. U.S. Pat. No. 3,184,202) and specific electric hair dryers (Eplan U.S. Pat. No. 4,225,106 and Assion U.S. Pat. No. 4,219,178) are also known.

SUMMARY OF THE INVENTION

Despite this great variety of approaches, there is lacking in the prior art a universal bracket that can be easily adapted to any one of a large number of differently configured electrical appliances, such as any of the great number of different styles of electric hair dryers.

The present invention meets this lack by providing a bracket for supporting small appliances with the improvement of having elongated wire supports made of malleable material of such a thickness and malleability that the support may be hand-bent to conform to and accommodate the shape of whatever style appliance it is used with, and is yet stiff enough to resist deformity under the weight of the appliance.

The present inventors have discovered that plastic-coated copper electrical conduit wire of about 12-gauge is ideally suited for forming such brackets with the plastic insulation serving to cushion and grip the appliance. Thus, an added advantage of the present invention is that it can be easily and economically constructed out of a commonly available material.

While such malleable wire has been available for many years, and malleable wire has been adapted to form artistic and even some practical end products such as a rack (e.g., as shown in Reed U.S. Pat. No. 3,532,225 entitled Convertible Geometric Structure), the present invention is the first to apply it to a wall bracket for a small appliance, such as an electric hair dryer, and achieve the advantages of providing a nearly universal bracket that is, after assembly, specifically conforming to the particular appliance.

Other novel features of the invention include a kit of parts that may easily be assembled into the bracket such that a longer bracket support member with a cord-receiving U-shaped hook can be easily mounted on either side of the finished bracket and the combination of the elongated bracket members into a two part electrical cover plate.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 1 is a perspective view of two brackets, each made in accordance with the present invention shown in use on a bathroom wall and holding, respectively, a hair dryer and an electric razor;

FIG. 2 is an enlarged view of one of the two brackets of FIG. 1 illustrating one of its advantages, and the ease with which it can be adapted by hand to fit any particular appliance;

FIG. 3 is an enlarged sectional view through a part of the bracket of FIG. 2 as seen from the line 3—3 in FIG. 2;

FIG. 4 is an exploded view of the bracket of FIG. 2, as well as a view of the kit of parts that may be assembled into that bracket, which view also illustrates the manner of assembly of the kit and illustrates one additional advantage of the invention;

FIG. 9 is a prespective view of a third embodiment of the invention;

FIG. 10 is a side view similar to that of FIG. 7, showing the bracket of FIG. 9 installed on a wall;

FIG. 11 is a perspective view of a fourth embodiment of the invention, one adapted to be secured to a pegboard and using two separate pieces to achieve the bracket.

DESCRIPTION OF THE PREFERRED EMBODIMENTS

Figure 6:
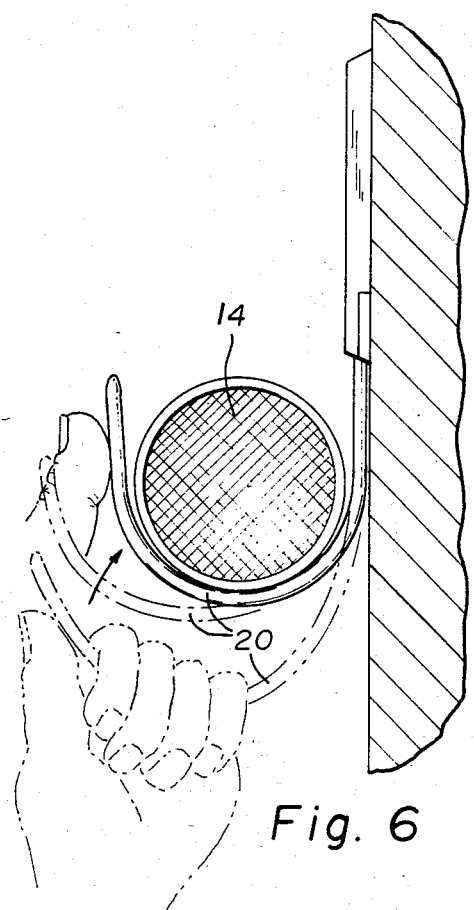
FIG. 6 is a side view of the bracket of FIG. 2 with an appliance, which view illustrates a number of moved positions for a member thereof in phantom lines.

Referring to FIG. 1, there is depicted a part of a typical modern bathroom 8, including a sink-vanity 9 and an electrical duplex outlet 10 mounted on a wall 11 at a convenient height, typically about 3½ feet from the floor and adjacent to the vanity 9.

Two wall brackets 12 and 12', each of which is constructed in accordance with the principles of the present invention, are provided mounted on the wall 11 in close approximation to the electrical outlet 10. The brackets 12, 12' serve to hold small electrical appliances such as the hair dryer 14 and electric razor 16 depicted in FIG. 1.

The bracket 12 has, as better shown in FIG. 2, a base 18 which is a replacement electrical outlet cover plate and, thus, serves to easily secure the bracket to the wall. The bracket 12 has two elongated support members 20, 22, each of which is in accordance with an important feature of the invention, made of a malleable material, such as electrical conduit grade, 12-gauge, copper wire 20W preferably coated as shown in FIG. 3 with a tough elastic covering 20P such as plastic. Electrical conduit wire of 12-gauge is nearly a perfect material. And it is commonly and conveniently available with a suitable plastic coating, such the covering 20P, already provided.

Referring again to FIG. 2, the support members 20 and 22 may be initially straight when shipped (or bent into any other convenient shipping configuration). The support member 20 is shown straight in FIG. 2. The members 20, 22 may be easily hand-bent to any desired configuration to receive the particular appliance. This is illustrated by the member 22 whose initial position is shown in dashed lines and which is being bent by the hand 24 into a final position (solid lines).

The free ends of members 20, 22 are preferably covered by a blunt covering or cap of plastic or rubber 20C, 22C which may be conventionally formed by repeatedly dipping the end into a suitable liquid plastic. Alternatively, the end may be blunted by forming a straight loop or by providing a tight-fitting screw-on end cap of, e.g., plastic.

The member 22 is longer than that of member 20 and is provided with an electric cord receiving U-shaped bend or loop 26, which is better seen in FIG. 4. As is also better appreciated from FIG. 4, the base 18 includes two parts a front section 18F and a rear section 18R, at least one of which sections is provided with grooves, such as the grooves 28, 30 in the rear base section 18R, for closely receiving the ends 20E, 22E of the member 20, 22. These ends preferably have the plastic coating removed and have the exposed wire bent at approximately 90° to form elbows. The grooves 28, 30 are preferably identically sized and shaped into a T arrangement so that either of the ends 20E, 22E can fit into either of the grooves 28, 30. This allows the longer member 22 and its U-shaped loop 26 to be positioned at either the right or left of the bracket 12.

As sold, the bracket 12 would preferably be a kit consisting of the parts shown in FIG. 4, namely, the base front section 18F, the rear section 18R, members 20 and 22, and a screw 18S which secures the base to the electrical outlet 10.

Figure 5:
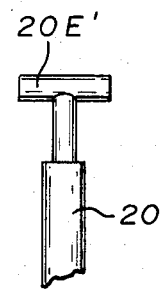
FIG. 5 is a partial view of an alternative construction for a portion of one part of the bracket of FIGS. 2-4.

The rear section 18R is secured to the front section 18F in any convenient manner, such as by providing projecting pins 18P which mate into receiving holes 18H in the rear section 18R. With this arrangement, the pins prevent the rear section 18R from moving downward or sideways when installed and the screw 18S serves to hold the front section 18F against the rear section 18R and the electrical outlet 10 and wall 11. Although a simple elbow bend end has, in practice, been shown to be entirely adequate for an even better grip, a T-shaped end 20E' could be used as shown in FIG. 5.

Referring to FIG. 6, there is illustrated one preferred way of conforming the supports 20, 22 to the appliance, such as the hair dryer 14. The user need only position the dryer in the desired placement and, grasping the member 20, bend it up as illustrated around the dryer 14. The same procedure can be, of course, used for the other member 22. Experiments on prototypes of the invention has shown that the members 20, 22 will remain substantially in the configuration they are bent into and not relax or tend to deform under the weight of the small appliance, and even if they are accidentally bent out of the desired shape, they can easily be returned to it.

Figure 7:
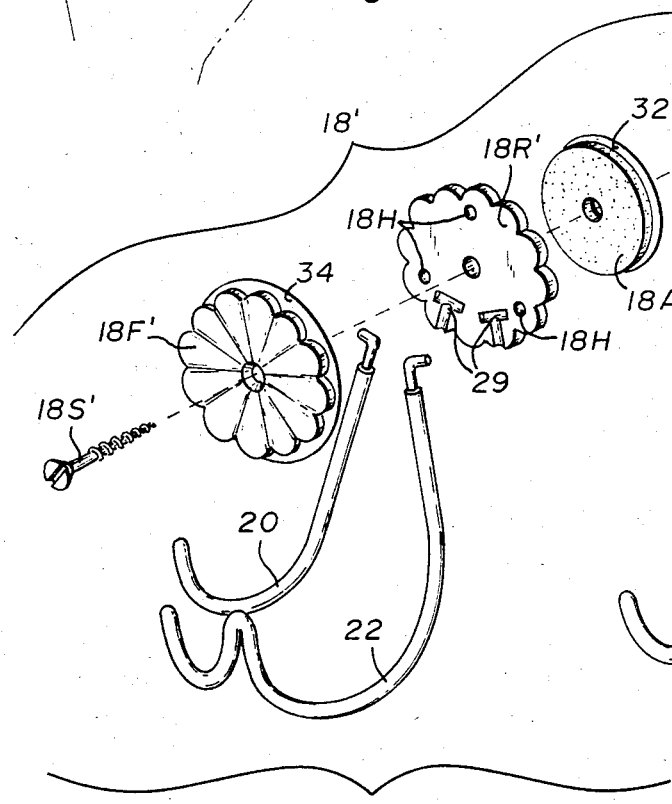
FIG. 7 is an exploded view of the kit of parts that form the second bracket of FIG. 1 illustrating their assembly in forming that second bracket.

Referring now to FIG. 7, there is depicted in more detail the kit of parts in exploded view arrangement that form the second embodiment of the invention, and the small bracket 12' of FIG. 1. In this embodiment, the support members 20, 22 may be identical to that of the bracket 12. The base 18' differs in that it is designed to be independently attached to the wall 11 and is preferably of a generally round disk shape and may be formed into a stylized daisy configuration as shown. The base 18' comprises a front section 18F' and a rear section 18R'. The latter preferably has grooves 29 formed therein which is really two side-by-side T's (that merge to form a phi-shaped groove).

A rear layer of conventional foam adhesive 18A is secured to the back of the section 18R' and covered by release paper 32. The interior surface of section 18F' also preferably has a coating of adhesive covered by a release paper 34.

The section 18F', 18R' and adhesive from 18A are provided with central holes for receiving a screw 18S'.

The bracket 12' may be easily assembled from the kit of parts of FIG. 6 by the user selecting which side to place the member having the loop 26, placing the members 20, 22 in the groove 29 and, after removing the release paper, pressing the pressure sensitive adhesive inner side against the grooved side of section 18R'. (Three alignment pins preferably project from section 18F to mate into holes 18H in section 18R so as to aid in aligning the two sections together). This captivates the ends 20E, 22E of the members 20, 22 in the base 28.

At this point, the members 20, 22 could be easily bent into the desired shape to receive a particular appliance. After that is done, the user need only select the position for the bracket, remove the release paper 32, and press the pressure-sensitive adhesive from layer 32 against the wall 11.

Figure 8:
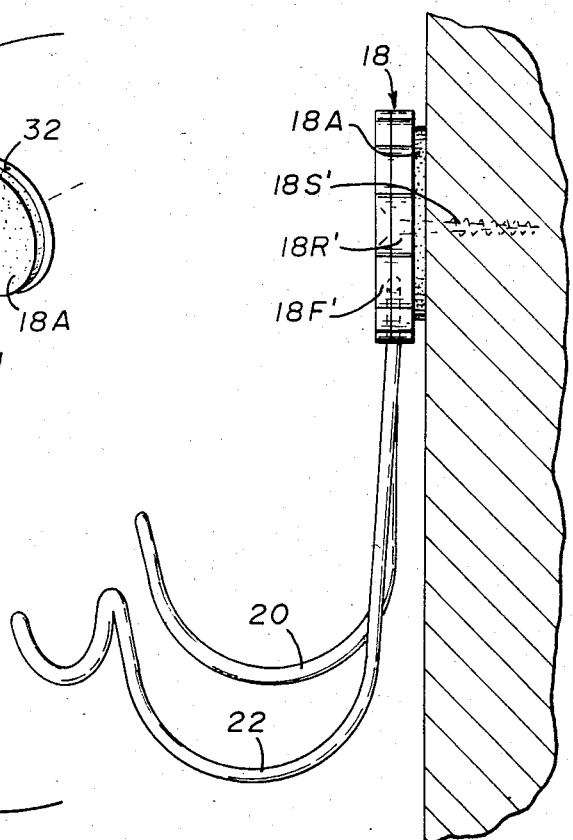
FIG. 8 is a side view of the bracket of FIG. 7 installed on a wall, which wall is shown in section with interior parts shown in phantom lines.

In some applications and walls, this would be sufficient. However, for greater strength, screw 18S' can be used in addition, as shown in FIG. 8, or in place of the adhesive.

Referring now to FIGS. 9 and 10, there is depicted a third embodiment of the invention. In this bracket 12''', the members 20, 22 are formed from a single length of wire, the central section of which also serves to form the base 18 which is secured by a screw 18S" (FIG. 10). At the ends of the members 20, 22 are caps 20C', 22C'. This version of the invention is quite economical to manufacture. It is also bilateral, as the loop 26 may be positioned on the left or right by turning the bracket 12''' over and bending the members 20, 22 in the opposite direction.

In FIG. 11, there is depicted another embodiment of the invention. This bracket 12'''' is adapted to a pegboard 40 and has it serve as the base. The ends 20E, 22E are formed into the conventional pegboard configuration so as to be easily received in it.

It should now be apparent that a useful and adaptable improvement in wall brackets for holding small appliances has been described and disclosed that is nearly universally adaptable to nearly any small appliance, whatever its shape or configuration. The bracket and kits of parts to make the bracket is easily and economically manufactured and used. The design is quite advantageous and provides that the user can have an electric cord-receiving loop at either the right or left side of the bracket.

While four particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

For example, the kit may be made with preformed elongated support members 20, 22 sized and shaped for a particular model of applicance and, thus, even more readily assembled to receive that particular model.

What is claimed is:

1. A wall bracket kit for holding any one of a large number of small electrical appliances such as a hair dryer, of different configurations, comprising:
    a base that is securable to a wall;
    a first and a second elongated support member, each of which has two ends, and one end securable to said base; and
    said elongated members being formed of a malleable material that is malleable enough to be hand-formed into a desired contour to conformly receive a particular small appliance, but stiff enough to hold that shape and the appliance without material deformation.

2. The kit of claim 1 wherein said first elongated member has a U-shaped loop formed at its other end for receiving the electrical cord of the small appliance.

3. The kit of claim 1 wherein one of said first or second elongated members is longer than the other and means are provided in the base for receiving and securing said longer member on either the right or left side of the base.

4. The kit of claim 1 wherein the base is an electrical wall outlet cover plate.

5. The kit of claim 3 wherein said first elongated member has a U-shaped loop formed at its other end for receiving the electrical cord of the small appliance and wherein the base is an electrical wall outlet cover plate.

6. In a small appliance support bracket of the type that may be mounted on a wall and has wire supports for holding an appliance, the improvement of making the wire supports out of malleable metal of such a thickness that the wire may be hand-bent to accommodate the shape of any one of a large number of different shaped appliances and yet be stiff enough to resist deforming under the weight of the appliance.

7. The invention of claim 6 wherein the wire supports are of about 12-gauge electrical-type wire and are coated with a flexible plastic envelope.

8. A wall bracket for holding a small electrical appliance such as a hair dryer having an electrical cord, comprising:
    a first elongated malleable wire member having an approximately 90° elbow at one end and the other end formed into a U-shaped loop for receiving the cord of the appliance;
    a second elongated malleable wire member having one end forming an approximately 90° elbow;
    a base comprising a front and back section and defining a pair of hollows into which the elbow ends of the two wire members may be closely received and captivated when the front and back sections of the base are held together; and
    means for securing the front and back sections together.

9. The wall bracket of claim 8 wherein the base defines hollows and the wire elbows are such that the wire members may be interchanged between either of the pair of hollows so that the first member can be on the left or right side of the base.

10. The wall bracket of claim 9 wherein the base is an electrical outlet cover.

11. The wall bracket of claim 9 wherein the base is to be secured to the wall by means of an adhesive backing.

12. The wall bracket of claim 9 wherein the base is secured to the wall and the front and back sections secured together by means of a screw passing through them and into the wall.

* * * * *

UNITED STATES PATENT OFFICE
CERTIFICATE OF CORRECTION

Patent No. 4,566,666          Dated Jan. 28, 1986

Inventor(s) Robert J. Meska and Mary F. Bishop

It is certified that error appears in the above-identified patent and that said Letters Patent are hereby corrected as shown below:

IN THE ABSTRACT:

Line 13, change "performed" to --preformed--.

Column 2, line 63,    change "prespective" to --perspective--.

Signed and Sealed this

Thirteenth Day of May 1986

[SEAL]

Attest:

Attesting Officer

DONALD J. QUIGG

Commissioner of Patents and Trademarks